US007266645B2

(12) United States Patent
Garg et al.

(10) Patent No.: US 7,266,645 B2
(45) Date of Patent: Sep. 4, 2007

(54) REDUCING COMMUNICATION FOR READS AND UPDATES IN DISTRIBUTED OBJECT SYSTEMS

(75) Inventors: Sharad K. Garg, Portland, OR (US); Todd A. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/368,539

(22) Filed: Feb. 18, 2003

(65) Prior Publication Data

US 2004/0162885 A1    Aug. 19, 2004

(51) Int. Cl.
  G06F 12/08    (2006.01)
  G06F 12/04    (2006.01)
  G06F 12/16    (2006.01)
(52) U.S. Cl. ............................ 711/133; 711/162; 714/6
(58) Field of Classification Search ............... 711/3, 711/118, 124, 133, 134, 141, 146, 206; 709/203, 709/213, 214, 216, 217
See application file for complete search history.

(56) References Cited

U.S. PATENT DOCUMENTS

| 5,146,573 | A | * | 9/1992 | Sato et al. ................... 711/206 |
| 6,336,147 | B1 |   | 1/2002 | Brownell et al. ........... 709/310 |
| 6,349,365 | B1 | * | 2/2002 | McBride ...................... 711/133 |
| 6,397,252 | B1 |   | 5/2002 | Sadiq .......................... 709/226 |
| 6,405,264 | B1 |   | 6/2002 | Jindal et al. ................ 709/316 |

FOREIGN PATENT DOCUMENTS

EP    747859 A2 * 12/1996

* cited by examiner

Primary Examiner—B. James Peikari
(74) Attorney, Agent, or Firm—Trop, Pruner & Hu, P.C.

(57) ABSTRACT

In a distributed system, a server may distribute a primary object copy having one or more chunks of data associated with a primary per-chunk metadata copy to a client over a network. The client may selectively fetch and update the one or more chunks of data of the primary object copy based on the primary per-chunk metadata copy. For example, by determining at a client whether a portion of the data in a cached data object, such as a file, is changed relative to a copy of a data object for the cached data object at a server, less than all of the data of the cached data object may be replaced with a corresponding data in the copy of the data object.

23 Claims, 6 Drawing Sheets

REDUCING COMMUNICATION FOR READS AND UPDATES IN DISTRIBUTED OBJECT SYSTEMS

BACKGROUND

Embodiments of present invention relate generally to the communication of data in distributed systems, and more particularly to facilitating the communications for data distribution.

Some distributed systems enable the distribution of data and associated information over a network, coupling a client and a server. Examples of the distributed data include database data, file data, or any data copies that may be shared across the distributed system. Some examples of the associated information include communicating requests from the client to read, write, update, or replicate the distributed data on the server and appropriate responses from the server to the client. These reads, writes, updates, and replication may be employed by a variety of distributed systems including distributed file and database systems.

Many distributed systems involve objects that may consist of smaller chunks of data that may be individually transferred over a network between a client and a server or vice versa. Such a distributed system is known as a distributed object system. Commonly, objects are referred to as data objects (e.g., of a file) that may be created on a server for distribution over a network to a client running an application. Associated with each object in a distributed object system may be some metadata that may contain information including an object's owner, date/time of creation and last modification, and object size. Servers provide a mechanism by which clients can read an object's metadata. In this manner, the objects may be first developed and then maintained by a party different than the party that developed the object. Optionally, a copy of the object may be replicated to another server, such as at a replica site holding a replica copy of the object.

However, when a client wants the most up-to-date version of an object, the client first discards the previously cached object data and then fetches the object data again if the application requires, communicating redundant object data. Upon opening an object, for example, the client typically first reads the object's metadata from the server to perform a consistency check to verify that the user is getting an up-to-date version of the object. When a client determines that an object has been changed, the client deletes all the cached data that the client has for that object. If, for instance, the client detects that the object's modification time does not match the modification time of the cached data for that object in its cache, then the client removes all that cached data and gets new data from the server when the application attempts to read it.

Sometimes distributed object systems may be scaled to a network with a larger number of clients. In these larger networks, the number of requests and the amount of data transferred between clients and the servers increases. Any increase in client communication with the server further deteriorates the performance of the server because more and more object data may be requested. As a result, the performance of the distributed object system and the network in terms of efficient usage of the network resources goes down because the network may get heavily loaded. In another scenario, the network distance between clients and servers may increase. In this scenario, the network latency between client and server increases and the time it takes for a client to read or write an object will correspondingly increase.

In most distributed object systems that support replication, when a copy of an object changes at a server, the entire new version of the object replaces a replica copy of the object at each replica site, involving distribution of the entire object for causing version updates. Furthermore, when the client updates the object and since the server normally bases replica updates on client updates, replica updates may similarly involve copying of the entire object.

Thus, there is a continuing need for better ways to communicate data in distributed systems, especially in communications associated with data distribution.

DETAILED DESCRIPTION

Figure 1:
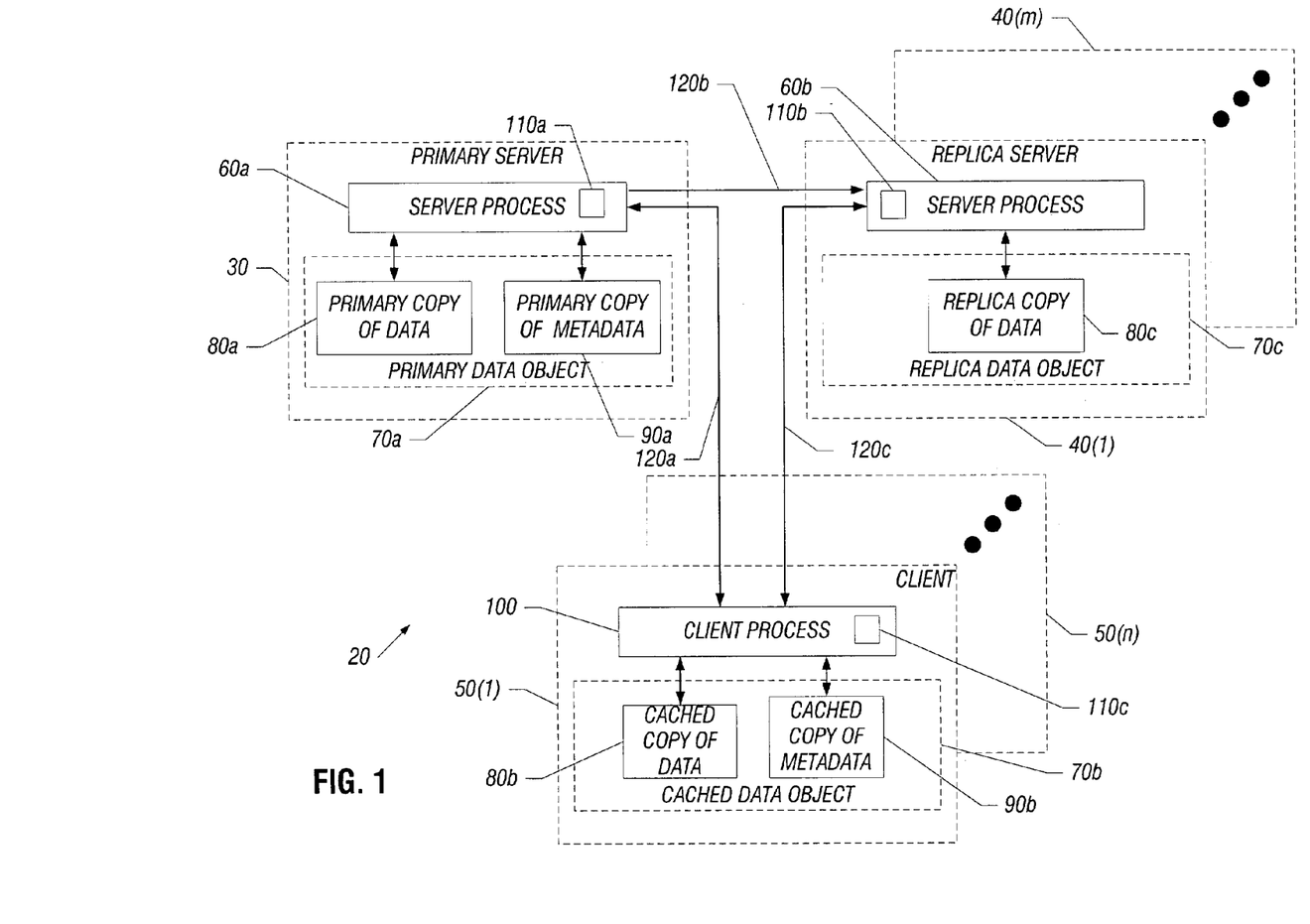
FIG. 1 is a schematic depiction of a distributed object system consistent with one embodiment of the present invention.

Referring to FIG. 1, a system, such as a distributed object system 20 may include a primary server 30 coupled to both a plurality of replica servers 40(1) through 40(m) and a plurality of clients 50(1) through 50(n) according to one embodiment of the present invention. In one embodiment, the primary server 30 may contain the primary copy of a data object 70a. The data object 70a may comprise the contents of primary data object 80a, and information (metadata) about the data object, 90a. Furthermore, the contents of primary data object 80a may be divided into sub-objects or "chunks" (see FIG. 2). The distributed object system may use the chunk as the unit of data transmission between servers, replicas server, and clients.

According to one embodiment of the present invention, all of the chunks for the contents of primary data object 80a may be stored on the primary server 30 as part of the data object 70a. Conversely, only some of the chunks of the data object 70a may be stored in a cached copy 80b and a replica copy 80c as part of a cached data object 70b and a replicated data object 70c, respectively. In another embodiment of the present invention, all of the chunks of the contents of primary data object 80a may be stored on both the primary server 30 and one or more replica servers 40(1) through 40(m).

According to one embodiment of the present invention, metadata 90a is not divisible as are object contents. Instead, metadata 90a ideally be transferred on an all-or-nothing basis. Metadata 90a may contain such information as the size of the object, the replica servers on which this object is replicated, and the identification of chunks that are stored on each replica server.

Depending upon a particular distributed protocol in use by the distributed object system 20, the protocol may allow the transfer of the chunks of the contents of primary data object 80a or metadata 90a between the primary server 30, the replica servers 40(1) to 40(m), and the clients 50(1) to 50(n). In one embodiment of the present invention, the distributed object system 20 may be a distributed file system in which data objects correspond to files, chunks correspond to file blocks, and the distributed file system protocol exchanges messages across a network as shown in interactions 120a, 120b, and 120c in FIG. 1. In this embodiment, the distributed file system protocol may be used to request updated versions of file blocks, to modify file blocks, and to push updated file blocks to appropriate replica servers 40(1) to 40(m). The distributed file system protocol may also be used to determine whether a client or a replica server has the latest version of a file block. In another embodiment of the present invention, the distributed object system 20 may be a distributed database system in which data objects correspond to tables, chunks correspond to records, and the distributed database protocol exchanges messages across a network as shown in the interactions 120a, 120b, and 120c in FIG. 1.

The primary server 30 includes a server process 60a capable of communicating with the clients 50(1) though 50(n) and the replica servers 40(1) through 40(m) upon a request therefrom, respectively. As shown in FIG. 1, the primary server 30 may create and hold the primary copy of the data object 70a, comprising the primary copy of the contents of primary data object 80a and the associated primary copy of the metadata 90a. Likewise, the client 50(1) may include a client process 100 to communicate with the primary server 30 and the replica servers 40(1) through 40(m). The client 50(1) may hold the cached data object 70b being a copy of the data object 70a stored at the primary server 30, in some embodiments of the present invention. The cached data object 70b may comprise a cached copy of the contents of cached data object 80b and an associated copy of metadata 90b.

When a client 50(1) wishes to use the cached data object 70b, the client 50(1) may first decide whether to use the most up-to-date version of the data object in existence. At this point, the client 50(1) may send a message across the interaction 120a via the distributed object system protocol to the primary server 30, asking for the metadata 90a corresponding to the primary copy of the data object 70a, hereinafter referred to as the primary data object 70a. The client 50(1) may then compare the received metadata 90a with its own copy of that object's metadata 90b. If the two copies of the metadata are determined to be identical, client 50(1) may conclude that the cached data object 70b has not been updated and may therefore presume that any chunks of the data object currently in the contents of cached data object 80b are up-to-date. If client 50(1) then wishes to examine a chunk that is not currently present in the contents of cached data object 80b, client 50(1) may send a read request to the primary server 30 or to one of the replica servers 40(1) through 40(m) using the distributed object system protocol across the interactions 120a or 120c, respectively.

If client 50(1) gets updated metadata from the primary server 30 and that metadata is newer than that metadata currently held in the client's cached copy of metadata 90b, instead of deleting in its entirety the client's cached copy of the contents of cached data object 80b (which is a normal behavior in conventional distributed object systems), the client 50(1) first identifies the portion of the cached copy of the contents of cached data object 80b that has actually changed relative to a previous version (see below) of the same data object resident at the primary server 30. Accordingly, rather than obtaining the entire new version of the primary data object 70a, only the portion which may have changed at the client 50(1) may be obtained from the primary server 30 in accordance with one embodiment of the present invention, reducing communication for data read and/or update in the distributed object system 20.

Although the distributed object system 20 is depicted with the replica servers 40(1) through 40(m) in FIG. 1, only one replica server, such as the replica server 40(1) may be coupled to the primary server 30. The replica server 40(1) may include a server process 60b residing therein, to operate on the replicated data object 70c. In one embodiment, the replicated data object 70c may include a replica copy of the contents of replicated data object 80c replica being of the primary copy of the contents of primary data object 80a.

Corresponding distributed process handlers 110a, 110b, and 110c may co-operatively function with the server process 60a, the client process 100, and the server process 60b as the communication interface, transparently handling object requests and responses across the distributed object system 20, according to one embodiment of the present invention. The process handler 110a, for example, may accomplish communication between the primary server 30, the clients 50(1) through 50(n), and the replica servers 40(1) through 40(m). To this end, the distributed object system 20 may use conventional object interface specifications that allow servers and clients to connect via a network over a conventional communication link including wired and wireless, as two examples. Any suitable interface definition language (IDL) may be utilized to enable inter-machine communication between the server process 60a, the client process 100, and the server process 60b using the process handlers 110a, 110b, and 110c.

In the distributed object system 20, the data objects (e.g., the primary data object 70a, the cached data object 70b, and the replicated data object 70c) may be routed or streamed between the clients 50(1) through 50(n) and the primary server 30, or the replica servers 40(1) through 40(m), depending upon a particular request. To obtain a data object or a portion thereof from the primary server 30 or to update a data object at the primary server 30, which may further be replicated in the replica server 40(1), communication information including requests from the clients 50(1) through 50(n) maybe received at the primary server 30, as one example.

In operation, using the server process 60a, the primary server 30 may communicate via the interaction 120a to the client process 100 employing the process handlers 110a and 110c. Likewise, when providing a replica of the primary data object 70a, the server process 60a may communicate using the server process 60b at the replica server 40(1). Using the process handlers 110b and 110c, in some situations, the client process 100 may directly communicate with the replica server 40(1) through the server process 60b via the interaction 120c. In this manner, the process handlers 110a, 110b and 110c may enable the inter-machine communications over the interactions 120a, 120b, and 120c using a distributed object system protocol.

The distributed object system protocol may determine a particular format for messages such as requests and responses that may be exchanged over a network, connecting the primary server 30, the clients 50(1) through 50(n) and the replica servers 40(1) through 40(m). Furthermore, the distributed object system protocol may define a specific operational behavior for the primary server 30, the clients 50(1) through 50(n) and the replica servers 40(1) through 40(m). Consistent with some embodiments of the present invention, the interactions 120a through 120b may be implemented over a variety of suitable networks using any number of appropriate communication protocols that may be deployed to enable inter-machine communication between the primary server 30, the clients 50(1) through 50(n), and the replica servers 40(1) through 40(m).

Figure 2:
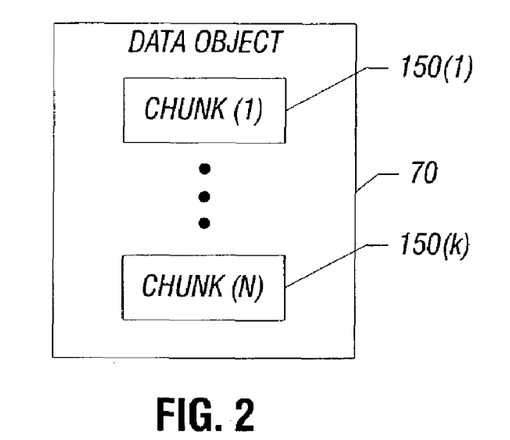
FIG. 2 is a schematic depiction of a data object for distribution in the distributed object system shown in FIG. 1 according to one embodiment of the present invention.

Referring to FIG. 2, a data object 70 may comprise one or more chunks, such as chunks of data 150(1) through 150(k) consistent with one embodiment of the present invention. In one example, the data object 70 may be of a file that may comprise multiple pieces of blocks of data. The data object 70 may be cached across a network of one or more clients (e.g., clients 50(1) through 50(n)) coupled to the primary server 30 as shown in FIG. 1, in accordance with one embodiment. Additionally, the data object 70 may be replicated at the replica servers 40(1) through 40(m).

According to one embodiment, the data object 70 may be divided into fixed-size chunks of data, such as the chunks 150(1) through 150(k). The size of the chunks of data 150(1) through 150(k) may be independent of the hardware used to implement the client 50(1) in some scenarios. However, the size of the chunks 150(1) through 150(k) may be dynamically changed over time. In one embodiment, the size of the chunks 150(1) through 150(k) may be optimized for transmission across the network between the primary server 30, the clients 50(1) through 50(n), and the replica servers 40(1) through 40(m). In another embodiment, the size of the chunks may be selected such that the size of the corresponding metadata information is ideally within a certain range.

Figure 3:
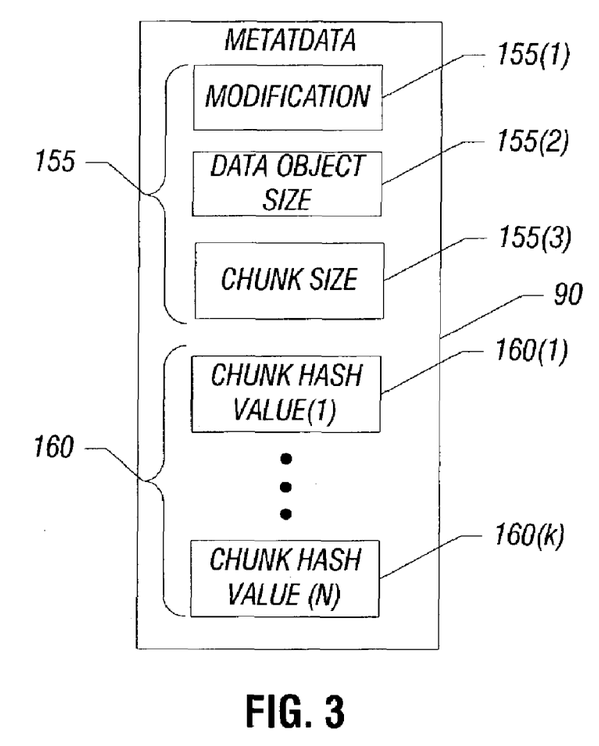
FIG. 3 is a schematic depiction of metadata associated with the data object shown in FIG. 2 according to an embodiment of the present invention.

Referring to FIG. 3, for the data object 70 shown in FIG. 2, metadata 90 may contain whole data object information 155. In one embodiment, within the metadata 90, the whole data object information 155 of the data object 70 may include a modification time 155(1), a data object size 155(2) and a chunk size 155(3). The modification time 155(1) may indicate, for example, a time when the data object 70 may have been last modified. The data object size 155(2) may indicate the size of the data object 70. Likewise, the chunk size 155(3) may indicate the size of the chunks of data 150(1) through 150(k). In one embodiment, the primary server 30 may choose to adapt the chunk size 155(3). For example, for a relatively large data object size 155(2), the chunk size 155(3) may be increased so as to reduce the size of the metadata 90 that the clients 50(1) through 50(n) may choose to retrieve before using the data object 70 in some embodiments.

The metadata 90 may further include a hash value corresponding to each chunk of data 150(1) through 150(k), such as chunk hash values 160(1) through 160(k). Specifically, the chunk of data 150(1) may be associated with the chunk hash value 160(1). The chunk hash value 160(1), for example, may be a numerical number computed by applying a hashing algorithm (such as SHA-1) to the contents of chunk 150(1). The resulting hash value has a sufficient high probability of changing in value whenever the contents of the chunk of data 150(1) change that the hash can be used for the purpose detecting that a chunk has been modified.

When a client 50(1) updates a data object 70b in its cache, client 50(1) may typically want to propagate those updates to the object to the primary server 30. To do this propagation, client 50(1) computes the hash value of each data object chunk in the contents of cached data object 80b. Client 50(1) then compares the computed chunk hash values with the chunk hash values last retrieved from the primary server 30 and stored in the metadata 90b in the form of 160(1) to 160(k). If the old and new hash values for a chunk do not match then the chunk has been modified by the client and therefore client 50(1) may send a write request with the updated chunk across the interaction 120a to primary server 30 and update the chunk hash values in the metadata 90b. The primary server 30 may then update its chunk contents of primary data object 80a and metadata 90a.

If the primary server 30 has previously replicated that modified data chunk on one or more of the replica servers 40(1) through 40(m), the primary server 30 may now want to update those replica servers with the new version of the data chunk that the client has just created. To do so, the primary server 30 issues a write request using the distributed object system protocol across the interaction 120b to those replica servers 40(1) through 40(m) containing the chunk in question.

In contrast, conventional distributed object systems only keep track of whether the object as a whole has been modified. If an object has been modified, then the client will write the entire contents of the object to the primary server 30 and this server may again send all of the contents to each replica server to update replica copies. Using the present invention, in one embodiment, only those object chunks that have changed have to be sent to the primary server 30 and since the primary server 30 only receives truly modified chunks, the primary server 30 may only send the modified chunks to replica servers 40(1) through 40(m).

In some embodiments of the present invention, the metadata comparison technique employed by clients 50(1) through 50(n) may significantly reduce the inter-machine communication between clients and servers (e.g., the primary server 30 and the replica server 40(1)), clients and replica server, and servers and replica servers. This reduction in communication may significantly improve client performance because only those blocks that need to be transferred are sent over the network. Likewise, the reduction in communication may improve server and replica server performance by reducing the number of requests that they must answer. Alternatively, the metadata comparison technique may allow the same number of servers to service a larger number of clients or may decrease the need for replica servers because each client will correspondingly be sending fewer requests to the primary server 30. In this way, the metadata comparison technique increases the scalability of the distributed object system 20. Finally, for any fixed number of servers, replica servers, and clients, this metadata comparison technique may improve the performance (e.g., lower load, reduced latency) of the computer network connecting the primary server 30, the replica servers 40(1) through 40(m), and the clients 50(1) through 50(n), in some embodiments.

A hypothetical performance analysis of the distributed object system 20 is described next to show some performance benefits over traditional distributed object systems. In this example, the data object's 70 chunk size 155(3) may be considered equal to S kilobyte (KB) and the data object's size 155(2) to be F kilobyte (KB), as an example. Therefore, the number of chunks of data 150(1) through 150(k), e.g. M, in the data object 70 may be M=⌈F/S⌉.

When all the modifications to the data object 70 reside in a single chunk of data (e.g., 150(1)), the resulting update factor may be: 1/M, and the size of data to transfer=S KB. If there are R replicas (including one in the primary server 30) in the distributed object system 20, then in one best case, ideally only one chunk of data may be updated in each replica server 40, and the total network traffic may be R*S KB, whereas a worst case may have been R*F KB of data transfer, resulting in the performance gain of (R*F)/(R*S) =F/S. Consequently, when assuming that F≈M*S, the attained performance gain may be M (i.e., the number of chunks of data in the data object 70).

For example, if the data object 70 consists of 10 chunks of data, then in one best case of the distributed object system 20, approximately ten times better performance may be provided over object sharing systems based on object level data exchange. In this example, the performance metric used is the reduction in network traffic. Assuming a uniform distribution of number of modified chunks of data, on an average, the number of modified chunks of data 150(1) through 150(k) in the data object 70 may be M/2. Therefore, while the average network traffic in the distributed object system 20 may be R*S*M/2, the resulting performance gain may be (R*F)/(R*S*M/2). As a result, when assuming that F≈M*S, attained performance gain may be approximated as (R*M*S)/(R*M*S/2), which is approximately 2. For one worst case in which modifications reside in all the M chunks of data, the update factor may be: M/M=1 and the size of data to update F KB. This case may ideally involve update of all chunks of data 150(1) through 150(k).

Figure 4:
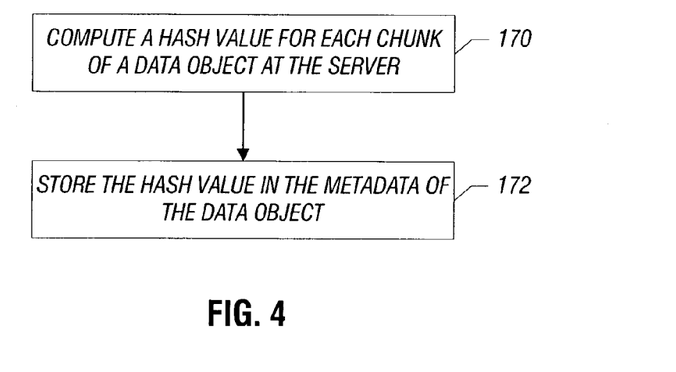
FIG. 4 is a flow chart showing creation of the data object by the primary server shown in FIG. 1 in accordance with one embodiment of the present invention.

Referring to FIG. 4, at some point the data object 70, shown in FIG. 2 may be created at the primary server 30, according to some embodiments of the present invention. The chunk hash values 160(1) through 160(n) may be computed for the chunks of data 150(1) through 150(k) for the primary data object 70a at block 170. The computed chunk values 160(1) through 160(k) may be stored in the metadata 90, such as the primary copy of metadata 90a, as indicated in block 172.

When the client process 100 of the client 50(1) requests for the primary data object 70a, the primary server 30 may respond to that request using the server process 60a. For example, the server process 60a may send the primary copy of metadata 90a in response to the request by the client process 100, indicating the state of the primary data object 70a in one embodiment. The client 50(1) may determine whether the cached copy of data 80b of the cached data object 70a is entirely changed or only certain chunks of data have changed since the client process 100 last obtained the primary copy of data 80a.

That is, the client 50(1) may detect a change in content for the chunks of data among the chunks of data 150(1) through 150(k) for the cached copy of data 80b relative to the primary copy of data 80a based on a change in value of the chunk hash values 160(1) through 160(k). Accordingly, the client 50(1) may obtain the chunks of data from the primary copy of data 80a which have their content either modified or deleted, as two examples. In this manner, the client process 100 may read only the changed chunks of the primary copy of data 80a instead of all the chunks of data 150(1) through 150(k) of the primary data object 70a.

Figure 5:
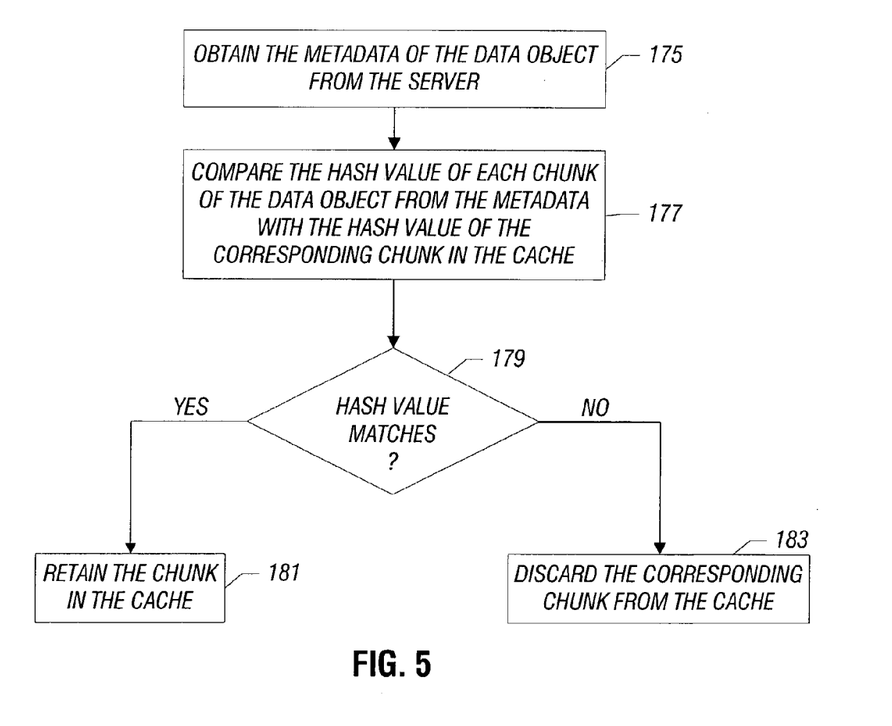
FIG. 5 is a flow chart showing reading of the data object by the client shown in FIG. 1 according to one embodiment of the present invention.

Turning now to FIG. 5, in order to determine which ones of the chunks of data 150(1) through 150(k) may have changed in terms of their content, the client 50(1) may issue a request to the primary server 30 for overwriting the cached copy of data 80b, in accordance with some embodiments of the present invention. To this end, the client process 100 may obtain the primary copy of metadata 90a of the primary data object 70a from the server process 60a at block 175. At block 177, the client process 100 may compare a chunk hash value of a chunk of data from the primary copy of metadata 90a with the chunk hash value of the corresponding chunk of data that resides in the cached copy of metadata 90b at the client 50(1).

In one embodiment, the chunk hash values 160(a) through 160(k) obtained from the primary copy of metadata 90a may be matched to the chunk hash values of the corresponding chunks of data 150(1) through 150(k) located in the cached copy of metadata 90b. A check at diamond 179 may indicate the chunk hash values in the primary copy of metadata 90a that match with the chunk hash values of the corresponding chunks of data in the cached copy of metadata 90b.

If for a particular chunk of data (e.g., the chunk of data 150(1)), the chunk hash value 160(1) of the primary copy of metadata 90a and the cached copy of metadata 90b match with one another, the client process 100 may retain the chunk of data 150(1) within the cached copy of data 80b at block 181. However, if the two chunk hash values do not match, the client process 100 may indicate to the client 50(1) to discard the corresponding chunk of data (for example, the chunk of data 150(k)) from the cached copy of data 80b as shown in block 183. In this manner, depending upon the chunks of data among the chunks of data 150(1) through 150(k) that changed in terms of their content, as determined by the above-described comparison, the client process 100 of the client 50(1) may issue the request to primary server 30, reading only the changed one or more chunks of data from the primary copy of data 80a into the cached copy of data 80b, in accordance with some embodiments of the present invention.

Figure 6:
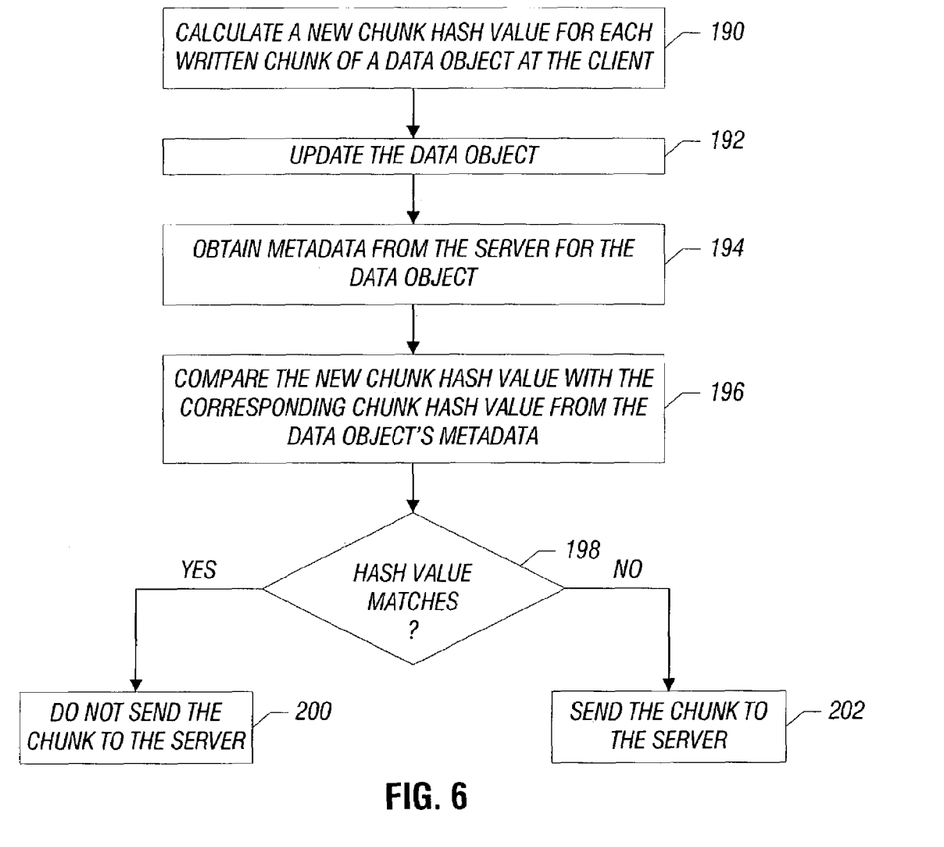
FIG. 6 is a flow chart showing the updating of the data object by the client shown in FIG. 1 in accordance with one embodiment of the present invention.

Referring to FIG. 6, the client 50(1) shown in FIG. 1, may update the cached data 70b, consistent with some embodiments of the present invention. For the purposes of updating the cached copy of data object 80b, the client process 100 at the client 50(1) may calculate a new chunk hash value, such as the chunk hash value 160(1) for each of the chunks of data 150(1) through 150(k) written into the cached copy of data 80b at block 190. At block 192, the client process 100 for the client 50(1) may initiate an updating process for the client data object 70b by issuing a request to the primary server 30. In doing so, the client process 100 may obtain the primary copy of metadata 90a of the primary data object 70a from the primary server 30 at block 194. Thereafter, the client process 100 may compare the new chunk hash value associated with the cached data object 70b with the corresponding chunk hash value obtained from the primary copy of metadata 90a of the primary data object 70a at block 196.

A check at diamond 198 may match the new chunk hash value with the corresponding chunk hash value to determine whether or not to send the chunk of data (e.g., chunk of data 150(1)) to the primary server 30, in one embodiment. If, at the diamond 198, the two chunk hash values do not match, at block 200 the client process 100 may not send the chunk of data 150(1) to the primary server 30. That is, the chunk of data 150(1) may be presumed to be unchanged from the previous version of the cached data object 70b. However, if the two chunk hash values do match at the diamond 198, the client process 100 may conclude that the chunk of data 150(1) has been modified from its previous version and therefore, the client 50(1) may send that chunk of data to the primary server 30. In this way, only the chunks of data which may have been modified at the client 50(1) may be written back to the primary server 30, significantly reducing the bandwidth requirement for the network upon which the client 50(1) may be communicating with the primary server 30 using the process handler 110b (FIG. 1), in accordance with many embodiments of the present invention.

Figure 7:
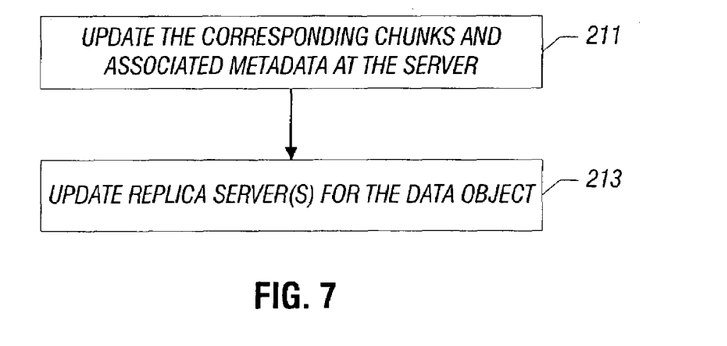
FIG. 7 is a flow chart showing the updating of the data object by the primary server shown in FIG. 1 according to one embodiment of the present invention.

Turning now to FIG. 7, at block 211, after obtaining the chunk of data 150(1) which is indicated to be modified at the client 50(1), the corresponding chunks of data in the primary copy of data 80a may be updated at the primary server 30. In addition, the primary copy of metadata 90a of the primary data object 70a may be updated, in one embodiment, synchronizing the cached data object 70b with the primary data object 70a. Optionally, the primary server 30, in turn, may update the replica data object 70c.

In one embodiment, the updating of the replica data object 70c stored at the replica server 40(1) may be based on the updates of the chunks of data indicated by the client 50(1) to the primary server 30, at block 213. However, the replica copy of data 80c ideally may only be updated for the replica data object 70c, as the replica data object 70c may not hold the associated metadata therewith. In order to accomplish the replicating of the primary data object 70a at the replica server 40(1), the server process 60a of the primary server 30 may communicate with the server process 60b of the replica server 40(1) via the process handlers 110a and 110b over the path 120b, as set forth earlier in the context of FIG. 1.

Figure 8:
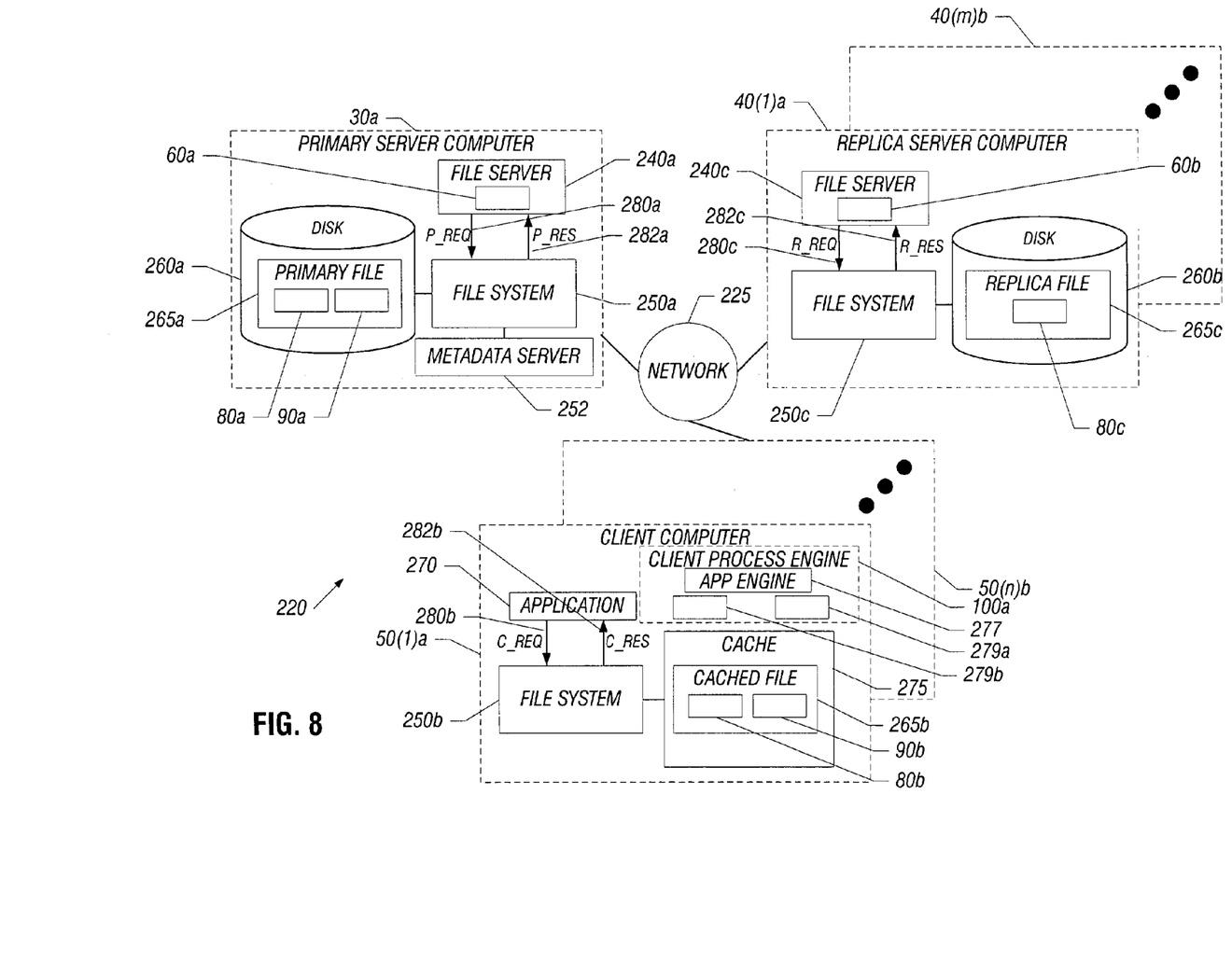
FIG. 8 is a block diagram of a distributed file system based on the distributed object system shown in FIG. 1 consistent with an embodiment of the present invention.

A distributed file system 220 is shown in FIG. 8 implemented on a network 225 comprising different processor-based systems, such as computers including a primary server computer 30a, client computers 50(1)a through 50(n)b, and replica server computers 40(1)a through 40(m)b operable to access copies of a file data object distributed there between, in accordance with one embodiment of the present invention. In particular, the primary server computer 30a may comprise a file server 240a that communicates with a file system 250a having an associated disk storage 260a, storing a primary copy of a file data object 265a. In one embodiment the file system 250a may be part of any suitable operating system (OS) loaded on the primary server computer 30a.

The primary copy of the file data object 265a may comprise the primary copy of data 80a and the associated primary copy of metadata 90a in one embodiment. The file server 240a may include the server process 60a to communicate with the file system 250a, providing file system operations on the primary server computer 30a. A separate metadata server 252 may be used for operating on the metadata 90, such as the associated primary copy of metadata 60a in one embodiment.

The primary server computer 30a may include the file system 250a to enable reading and/or writing of the primary copy of the file data object 265a in the disk storage 260a for the file server 240a, depending upon a particular request from one or more of the client computers 50(1)a through 50(n)b over the network 225. Specifically, the file system 250a may implement the process handler 110a (FIG. 1) at the primary server computer 30a, as an example. The requests from the client computers 50(1)a through 50(n)b may include read and/or write requests for the file server 240a. The file server 240a over the network 225 may provide input/output (I/O) communications for the file system 250a.

As shown in FIG. 8, on the client computer 50(1)a, a client process engine 100a may execute an application 270 using a file system 250b substantially similar to the file system 250a, in one embodiment. The client process engine 100a may comprise an application (APP) engine 277 to execute the application 270 using the file system 250b. In addition, for some embodiments in which the application engine 277 is provided, a read engine 279a and an update engine 279b may selectively read a portion of the file data object 265a, the update engine 279b may update the read portion of the file data object 265a based on a change therein at the client computer 50(1)a.

The file system 250b may utilize a cache 275 for the purposes of caching the primary copy of the file data object 265a as a cached copy of the file data object 265b. The cached copy of the file data object 265b may include the cached copy of data 80b and the associated cached copy of metadata 90b. Of course, any suitable caching algorithm may be utilized for caching data.

Likewise, the replica server computer 40(1)a, for example may comprise a file server 240b operably coupled to a file system 250c, such as the file system 250a, capable of accessing a disk storage 260b in one embodiment. The file server 240c may comprise the server process 60b (FIG. 1) to interact with the file system 250c, providing file system operations to the replica server computer 40(1)a. The disk storage 260b may store a replica copy of the file data object 265c, including the replica copy of data 80c.

The distributed file system 220, in one embodiment, may allow scalability without significantly increasing the latency of the network 225. The scalability refers to the ability of the distributed file system 220 to either scale up or down, supporting a desired number of the client computers 50(1)a through 50(n)b and the replica server computers 40(1)a through 40(m)b. In this way, support for a relatively large number of users, while handling a significantly larger number of the file data objects, resulting in a larger number of transactions or communications may be provisioned in the distributed file system 220. To this end, the server process 60a, the client process 100a, the server process 60b, regardless of the physical location, may communicate via inter-process communications over the network 225 with one another using the process handlers 110a, 110b and 110c distributed across there between. For handling requests from the application 270 at the primary server computer 30a, connections between the primary server computer 30a, the client computer 50(1)a and the replica server computer 40(1)a may be established over the network 225. Although a distributed client-server environment is illustrated in FIG. 8, a host of other possible distributed systems may be implemented without deviating from the scope of the present invention.

Using inter-machine communications, such as those between servers, replica servers, and clients based on the server process 60a, the client process engine 100a, the server process 60b to access the primary copy of the file data object 265a, the file server 240a may issue a primary request (P_REQ) 280a to the file system 250a in response to a request from the application 270, executing on the client computer 50(1)a in one example. Once the appropriate primary copy of the file data object 265a is located by the file system 250a at the disk storage 260a, a primary response (P_RES) 282a may be provided to the file server 240a. Using the server process 60a, the file server 240a may formulate a response to the request from the client computer 50(1)a for communicating appropriate data the primary copy of the file data object 265a, in one embodiment.

At the client computer 50(1)a, the application 270 using the client process engine 100a may formulate a request to the primary server computer 30a, for example either to read the primary copy of the file data object 265a or to update the cached copy of the file data object 265b, in some embodiments. To this end, the client process engine 100a may generate an internal client request (C_REQ) 280b to the file system 250b. In response, the file system 250b may access the cache 275 for the application 270, obtaining the cached copy of the file data object 265b, including the cached copy of data 80b and/or the cached copy of metadata 90b, depending upon a particular request.

While replicating the primary copy of the file data object 265a at the replica server computer 40(1)a, the file server 240a may use the server process 60a to issue a replica request (R_REQ) 280c to the file system 250c resident therein. Depending upon the replica request 280c, the file system 250c may write to the disk storage 260b, overwriting the replica copy of the file data object 265b with the primary copy of the file data object 265a. However, only the updated portion or content of the primary copy of data 80a based on the cached copy of data 80b, may be replicated or overwritten on the replica copy of data 80c, making the two copies consistent with one another.

Figure 9:
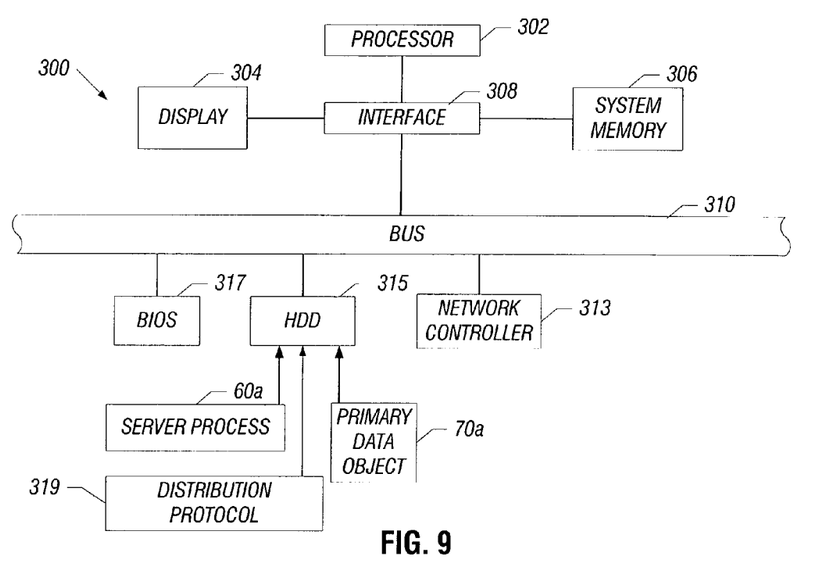
FIG. 9 shows a processor-based system for the primary server computer shown in FIG. 8 according to one embodiment of the present invention.

Some embodiments of the primary server computer 30a shown in FIG. 8 may be implemented in software for execution by a processor-based system 300, as shown in FIG. 9. In one embodiment of the present invention, the processor-based system 300 may include a processor 302 coupled to a display 304 and a system memory 306 through an interface 308. One example of the system memory 306 is a dynamic random access memory (DRAM). The interface 308 may be a bridge circuit in one embodiment, or may include one or more buses in another embodiment. In the processor-based system 300, a primary bus 310 conforming to the peripheral component interface (PCI) standard, for example, may couple a network controller 313, a hard disk drive (HDD) 315 and a basic input/output system (BIOS) 317 to the processor 302 through the interface 308. In this manner, the primary bus 310 may couple to the interface 308 while providing an interface to peripheral devices. The network controller 313 may adapt the primary data object 70a for internal transfer within the processor-based system 300. For example, the network controller 313 may be a conventional modem that transfers the file data object 265a of a file that may comprise blocks of fixed size data in the HDD 315.

The server process software 60a, the primary data object 70a and a conventional data distribution protocol 319, as shown in FIG. 8 may be loaded into the hard disk drive (HDD) 315 according to some operations consistent with certain embodiments of the present invention. In this manner, the processor-based system 300 may be responsible for distributing the primary data object 70a. However, wireless systems may be implemented in some embodiments of the present invention.

Figure 10:
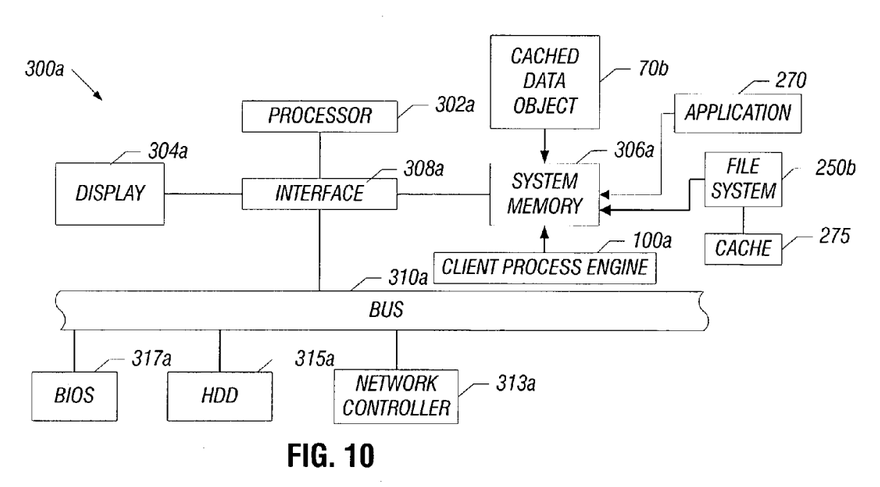
FIG. 10 shows a processor-based system for the client computer shown in FIG. 8 in accordance with one embodiment of the present invention.

Although not so limited, many embodiments of the client computer 50(1)a shown in FIG. 8 may be implemented in software for execution by a processor-based system 300a, as shown in FIG. 10. Consistent with an embodiment of the present invention, the processor-based system 300a may include a processor 302a coupled to a display 304a and a system memory 306a through an interface 308a, which may be a bridge circuit, or may include one or more buses. One example of the system memory 306a is a dynamic random access memory (DRAM). A primary bus 310a conforming to the peripheral component interface (PCI) standard, for example, may couple a network controller 313a, a hard disk drive (HDD) 315a and a basic input/output system (BIOS) 317a to the processor 302a through the interface 308a. Using the primary bus 310a, the interface 308a may provide an interface to peripheral devices. The network controller 313a may adapt the cached data object 70b for internal transfer within the processor-based system 300a. For example, the network controller 313a may be a conventional modem that receives the file data object 265b of a file that may comprise fixed size blocks of data in the HDD 315a.

According to an operation consistent with many embodiments of the present invention, the client process engine 100a, the cached data object 70b, the application 270, and the file system 250b, as shown in FIG. 8 may be loaded into the system memory 306a. In this way, the processor-based system 300a may provide for reading and updating of the cached data object 70b. Without deviating from the sprit of the present invention, wireless systems may be implemented as well for other embodiments.

Instead of creating a new version each time when the cached data object 70b is modified, the client process engine 100a may selectively flush cached data for the cached data object 70b, i.e., retaining data for unmodified portions but removing the cached data that have been modified since the cached copy were last received. By providing a secure way to read and update data while reducing the data communications on the network, the performance for networked devices including but not limited to mobile devices with weak or intermittent connectivity may be greatly enhanced in some cases. In turn, the network traffic may be significantly reduced in the distributed file system 220 shown in FIG. 8.

As one specific example, the efficiency may be substantially increased of planetary scale object systems that use a planetary file system (PFS). With such a PFS, barriers to object sharing may be reduced and processor-based systems like personal computers (PCs) and enterprise desktops may be deployed in a planetary object system, providing computing efficiency up to the edges of the network capacity while producing richer user experiences than possible otherwise.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    determining whether a portion of data in a cached data object is changed;
    if so, replacing less than all of data of the cached data object with a corresponding data in a copy of a data object;
    reconfigurably dividing the copy of the data object into at least two data chunks; and
    associating per-chunk meta-information with said at least two data chunks for selective distribution of the cached data object.

2. The method of claim 1, wherein replacing the changed portion of data comprising:
    providing a replica of the copy of the data object to a replica site.

3. The method of claim 2 comprising:
    determining at a server whether the copy of the data object is changed relative to the replica of the copy of the data object; and
    if so, sending the changed portion of data of the copy of the data object to the replica site.

4. The method of claim 1 comprising:
determining at a client whether the portion less than all of data in the cached data object is changed relative to the copy of the data object for the cached data object at a server.

5. The method of claim 4 comprising:
dividing the copy of the data object into at least two data chunks at the server;
associating per-chunk meta-information with said at least two data chunks for distribution thereof over a network in a distributed object system to the client; and
using the per-chunk meta-information at the client to selectively replace the changed portion of data of the copy of the data object at the server.

6. The method of claim 1 comprising:
associating per-chunk meta-information with the copy of the data object at a granularity less than the data object; and
using inter-machine communication across a client and a server in a distributed object system for selective distribution of the cached data object based on the per-chunk meta-information associated with the copy of the data object.

7. The method of claim 6 comprising:
identifying at the client a change in the per-chunk meta-information of the cached data object, wherein the per-chunk meta-information including metadata.

8. The method of claim 6 comprising:
dividing the copy of the data object into at least two data chunks of a fixed size being independent of the client.

9. The method of claim 8 comprising:
dynamically changing the fixed size of said at least two data chunks of the copy of the data object based on the per-chunk meta-information associated therewith.

10. The method of claim 8 comprising:
caching said at least two data chunks into a cache at the client;
identifying at least one data chunk of said at least two data chunks for which the per-chunk meta-information is changed; and
discarding only said at least one data chunk from the cache.

11. The method of claim 10 comprising:
storing a version of the copy of the data object at the server and a copy of the version of the data object at a replica site; and
reading said at least one data chunk in the cache from the version of the copy of the data object stored at the server.

12. The method of claim 11 comprising:
copying to the replica site said at least one data chunk to replace a corresponding data chunk within the copy of the version of the data object therein.

13. The method of claim 8 comprising:
computing a hash value for each of said at least two data chunks of the data object at the server; and
storing the computed hash value for said each of said at least two data chunks in the metadata associated with the copy of the data object.

14. The method of claim 13, wherein upon a request to the server, receiving the metadata associated with the copy of the data object at the client.

15. The method of claim 13 comprising:
calculating a new hash value for said at least one data chunk data of said at least two data chunks to update the copy of the data object for the client; and
upon a request from the client, receiving the metadata associated with the copy of the data object from the server.

16. The method of claim 15 comprising:
comparing the new hash value of said at least one data chunk with the computed hash value from the corresponding metadata of the cached data object at the client; and
based on the comparison, determining whether the new hash value is different than the computed hash value.

17. The method of claim 16 comprising:
if different, sending said at least one data chunk to the server for update thereof; and
otherwise, indicating to the server that said at least one data chunk is unchanged.

18. The method of claim 17, wherein upon receiving said at least one data chunk from the client, updating the corresponding data chunk and the corresponding metadata of the copy of the data object at the server.

19. An article comprising a medium storing instructions that, if executed, enable a processor-based system to:
determine whether of data in a cached data object is changed;
if so, replace less than all of data of the cached data object with a corresponding data in a copy of a data object;
reconfigurably divide the copy of the data object into at least two data chunks; and
associate per-chunk meta-information with said at least two data chunks for selective distribution of the cached data object.

20. The article of claim 19, comprising a medium storing instructions that, if executed, enable a processor-based system to:
provide a replica of the copy of the data object to a replica site.

21. The article of claim 20, comprising a medium storing instructions that, if executed, enable a processor-based system to:
determine at a server whether the copy of the data object is changed relative to the replica of the copy of the data object; and
if so, send the changed portion of data of the copy of the data object to the replica site.

22. The article of claim 20, comprising a medium storing instructions that, if executed, enable a processor-based system to:
determine at a client whether the portion less than all of data in the cached data object is changed relative to the copy of the data object for the cached data object at a server.

23. The article of claim 22, comprising a medium storing instructions that, if executed, enable a processor-based system to:
divide the copy of the data object into at least two data chunks at the server;
associate per-chunk meta-information with said at least two data chunks for distribution thereof over a network in a distributed object system to the client; and
use the per-chunk meta-information at the client to selectively replace the changed portion of data of the copy of the data object at the server.

* * * * *